United States Patent [19]

Runyon

[11] Patent Number: 4,733,831
[45] Date of Patent: Mar. 29, 1988

[54] ANTI-BACKLASH ATTACHMENT FOR FISHING REEL

[76] Inventor: Clinton A. Runyon, 174 Emerite Dr., Lafayette, La. 70506

[21] Appl. No.: 893,886

[22] Filed: Aug. 6, 1986

[51] Int. Cl.$^4$ ............................................. A01K 89/00
[52] U.S. Cl. ............................................. 242/84.1 L
[58] Field of Search .................... 242/84.1 L, 125.3

[56] References Cited

U.S. PATENT DOCUMENTS 2,957,641  10/1960  Humphrey .................... 242/84.1 L

FOREIGN PATENT DOCUMENTS 1084077  1/1955  France ............................ 242/125.3
1152234  2/1958  France .......................... 242/84.1 L
225706  12/1924  United Kingdom ............ 242/125.3

Primary Examiner—Lenard A. Footland
Attorney, Agent, or Firm—Fleit, Jacobson, Cohn & Price

[57] ABSTRACT

A radially split thin wall sleeve constructed of resilient material is provided and circumferentially openable for radially engagement about a bait casting reel spool and the fishing line remaining on the spool after a bait casting operation has been carried out to a desired distance. The sleeve includes circumferentially spaced disposing ends between which the line extending from the spool extends and the spool may be rotated in the line winding direction in order to wind that portion of line to be used during the next casting operation upon the spool over the sleeve. During the subsequent cast that portion of line wound upon the spool over the sleeve will be freely unwound therefrom and the line and sleeve will thereafter exert frictional resistance to further rotation of the spool in the line unwinding direction.

3 Claims, 3 Drawing Figures

ANTI-BACKLASH ATTACHMENT FOR FISHING REEL

BACKGROUND OF THE INVENTION

1. Field of the Invention

This invention relates to a split sleeve attachment for positioning about a bait casting reel line spool and the quantity line thereon after a cast of line from the reel has been made with an associated rod. The remaining line is then wound on the spool over the attachment and attachment lightly frictionally grips the spool and the amount of line remaining wound thereon beneath the attachment to prevent the backlash of line upon the reel beneath the attachment during subsequent casting operations.

2. Description of Related Art

The attachment of the instant invention has the general structure and appearance of a partial cylindrical napkin holder and other split sleeve-type structures. However, the attachment of the instant invention is of a wall thickness and resiliency to lightly frictionally grip the outer convolutions of fishing line on a bait casting reel line spool after a predetermined amount of line has been unwound from the spool (as in a casting operation) and the attachment has been radially engaged about the spool and line remaining.

SUMMARY OF THE INVENTION

The attachment of the instant invention is in the form of a split cylindrical sleeve constructed of resilient material. The wall thickness of the sleeve and the resiliency of the material of which the sleeve is constructed coact to enable the sleeve to be radially engaged with a bait casting reel spool having a quantity of line wound thereon to a diameter which is at least slightly greater than the inside diameter of the sleeve in its static condition.

The sleeve may then function to prevent the backlash of the quantity of line wound on the spool inwardly of the sleeve and the amount of line to be used in casting operations may be wound on the spool exteriorly of the sleeve.

It is also pointed out that the sleeve, after the amount of fishing line wound thereover on the spool has been unreeled therefrom during a casting operation, serves to frictionally resist further casting of the bait or lure on the free end of the fishing line. Accordingly, the sleeve not only serves to prevent a backlash of that quantity of line wound on the associated reel spool inwardly of the sleeve, but also as a means to enable a fisherman to achieve accurate casting distances.

The main object of this invention is to provide an attachment for a bait casting reel which will serve to prevent a backlash of that quantity of fishing line wound on the reel spool in excess of that amount of line to be used in bait or lure casting operations.

Another object of this invention, in accordance with the immediately preceding object, is to provide an attachment which will enable further amounts of line to be unwound from the spool of the associated reel after a fish strike.

Yet another object of this invention is to provide a bait casting reel spool attachment which may be used effectively to variably adjust casting distances.

Another important object of this invention is to provide an attachment in accordance with the preceding objects and which is easily applied to and removed from an associated bait casting reel spool.

A final object of this invention to be specifically enumerated herein is to provide an anti-backlash attachment for a bait casting reel spool in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 2:
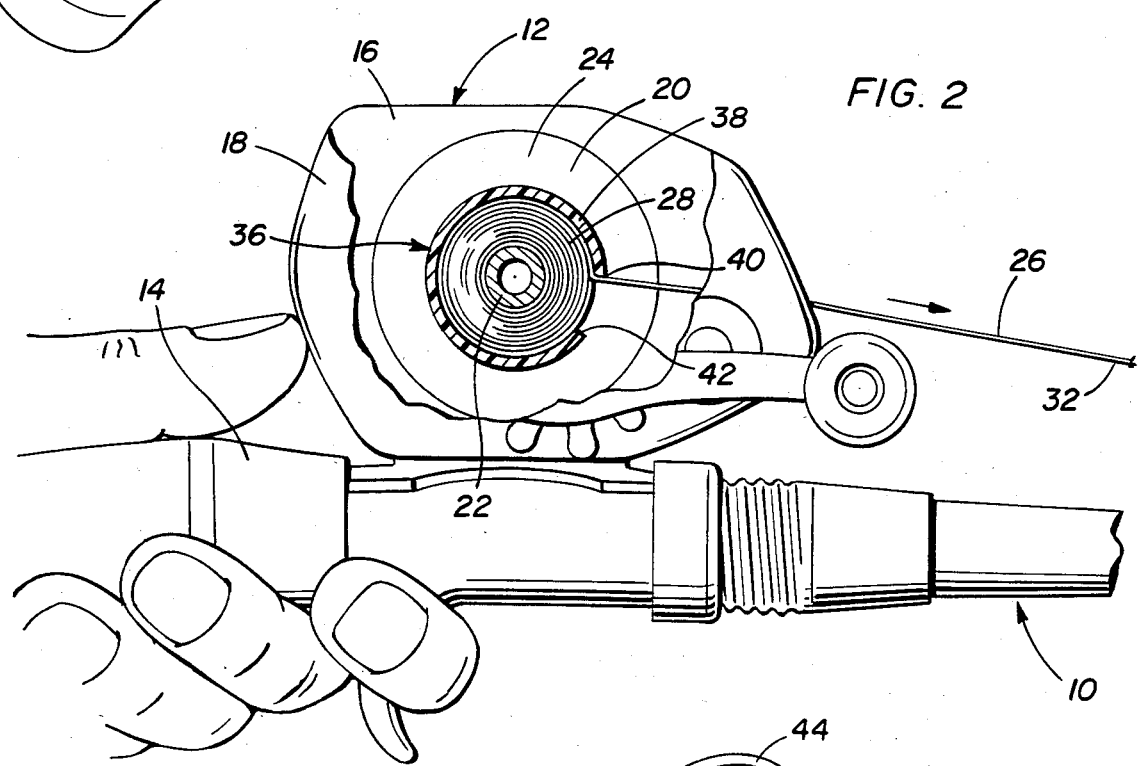
FIG. 2 is a fragmentary enlarged elevational view of the assemblage illustrated in FIG. 1 and with portions of the near side plate of the bait casting reel broken away and the reel spool and attachment illustrated in vertical section, the amount of line wound over the attachment in FIG. 1 having been unwound from the reel in FIG. 2.

Referring now more specifically to the drawings, the numeral 10 generally designates a conventional form of bait casting rod having bait casting reel referred to in general by the reference numeral 12 mounted on the handle end 14 of the rod 10. The reel 12 includes opposite side plates 16 and 18 between which the rotary spool 20 of the reel 12 is journalled, the spool 20 including a small diameter mid-portion 22 and large diamater opposite end portions 24. A first overall quantity of line 26 is operatively associated with the reel spool 20 and has a second quantity or portion 28 of the overall quantity of line 26 wound on the mid-portion 22 thereof. In FIG. 2 of the drawings, a third quantity or portion 32 of line is unwound from the spool 20 and comprises a length of line which, when combined with the quantity 28, comprises the overall quantity of line 26 associated with the reel spool 20.

Figure 3:
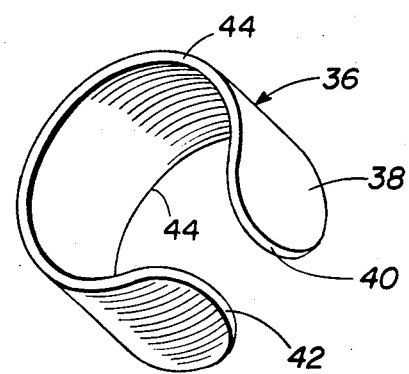
FIG. 3 is an enlarged perspective view of the attachment.

The attachment of the instant invention is referred to in general by the reference numeral 36 and comprises a partial cylindrical or split sleeve member 38 including convexly rounded spaced uninterrupted end edges 40 and 42 each merging smoothly into the corresponding ends of uninterrupted opposite side longitudinal edges 44 of said clip. The split sleeve member 38 may be constructed of inexpensive plastic material of a given resiliency and the radial thickness of the sleeve member 38 combined with the resiliency of the material with which the sleeve member is constructed enables the sleeve member 38 to have its opposite ends spread apart a distance greater than the outside diameter of the sleeve member 38 when the latter is in its static condition illustrated in FIG. 3. The sleeve member 38 is generally 330° in angular extent when in its static condition and the axial length of the sleeve member 38 is substantially equal to the axial length of the reel spool 20 between the opposite end portions 24 thereof.

Figure 1:
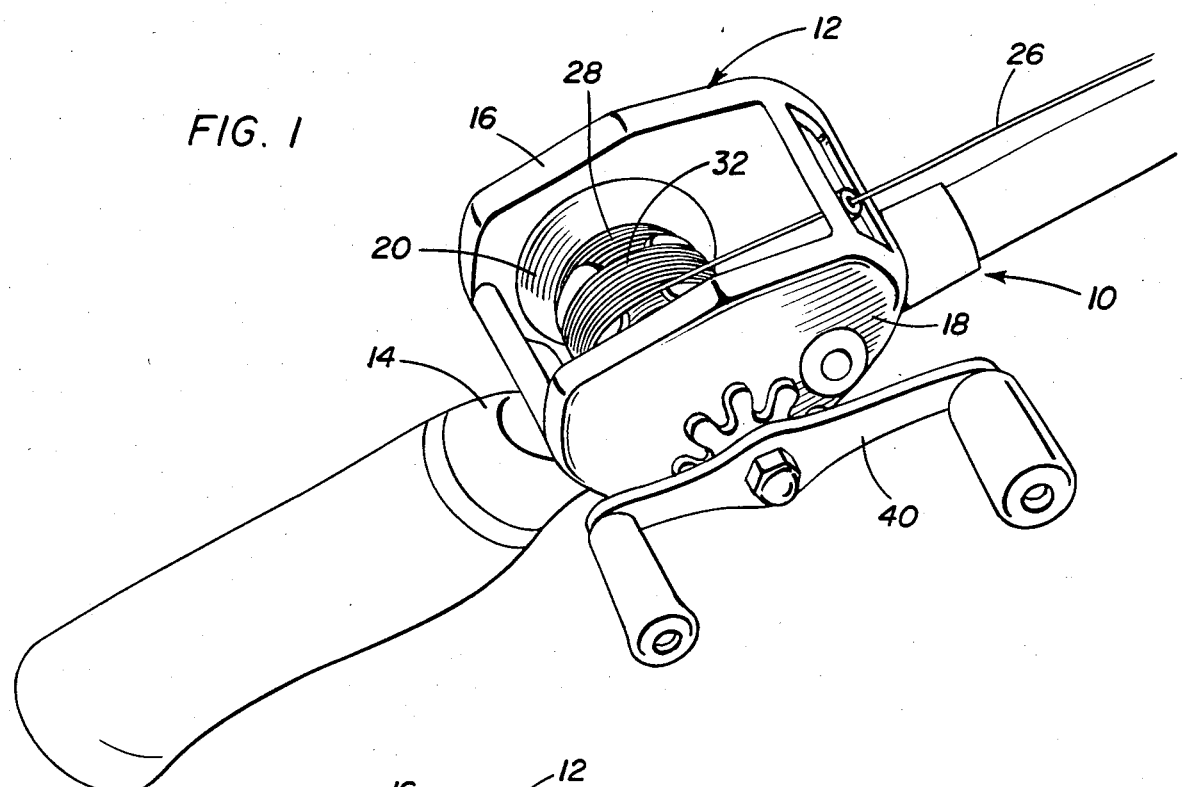
FIG. 1 is a perspective view of the handle end of a fishing rod upon which a bait casting reel is mounted and with the anti-backlash attachment of the instant invention operatively associated with the reel spool and having an amount of fishing line wound thereover upon the spool equivalent to the length of a desired cast.

In operation, after the fishing rod 10 has been utilized to cast a bait or lure the desired distance, the sleeve member 38 is opened and positioned about the second quantity or portion 28 of line 26 remaining on the reel spool 20 with the adjacent end of the third quantity 32 of line 26 extending outward from the second quantity 28 between the end edges 40 and 42 of the attachment 36. Then, the third quantity or portion 32 of line 26 may be wound about the spool 20 over the sleeve member 38 by rotating the crank 40 of the reel 12 in a clockwise direction as viewed in FIG. 1. Thereafter, subsequent casts of the third quantity 32 of line 26 may be made with the attachment 36 frictionally engaged with the second quantity 28 of line 26 on the spool 20 without the second quantity 28 developing a backlash. Furthermore, as soon as the third quantity 32 of line 26 has been cast, the attachment 36, in conjunction with the portion of the line 26 extending outward between the end edges 40 and 42, will frictionally resist further rotation of the spool 20 in a clockwise direction as viewed in FIG. 2 and therefore limit the distance the third quantity 32 of line 26 may be cast from the rod 10. This is extremely important insofar as fishermen having minimum or average bait casting ability are concerned. With the attachment 36 in use, casts of more than the third quantity 32 of line 26 from the reel 20 are substantially eliminated, thereby enabling fisherman having minimum or average bait casting ability to cast a bait or lure very close to a distant object.

In addition, if a fisherman, having the attachment 36 in place, has had little luck casting to one spot and he then wishes to cast toward a more distant second location, after his last cast in the first location he may manually strip an additional amount of line 26 from the reel equivalent to the greater distance of his next cast, reel in the line 26 and then make an accurate first cast to the more distant location.

It is also pointed out that thumb pressure on the quantity 32 also may be used to make a cast shorter than that which otherwise would be allowed by the quantity 32.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a bait casting reel of the type including a rotary spool upon which a first quantity of line is wound in excess of that amount of line to be unwound from the spool during a bait casting operation, an anti-backlash attachment for said spool, said attachment including a partial cylindrical clip including spaced apart ends and constructed of resilient material and of appreciably greater than 180° and less than 360° in angular extent, said spool having a central portion thereof about which said quantity of line is wound, the axial extent of said clip being at least slightly less than the axial extent of said central portion, said clip being openable and radially engageable about said spool and a second quantity of line thereon less than the first quantity with said clip at least lightly frictionally engaged with the outer convolutions of said second quantity of line and said line including a free end portion comprising a third quantity of said line extending outward between the spaced ends of said clip and being windable on said spool over said clip, said clip including uninterrupted opposite longitudinal edges, said ends including uninterrupted convexly rounded end edges each merging smoothly into the corresponding ends of said opposite side longitudinal edges.

2. The reel, line and clip combination of claim 1 wherein said clip is constructed of plastic.

3. The reel, line and clip combination of claim 1 wherein said clip includes an angular extent of approximately 330° when disposed about said spool and second quantity of line.

* * * * *